United States Patent
Albrecht et al.

(10) Patent No.: US 11,522,762 B2
(45) Date of Patent: Dec. 6, 2022

(54) COORDINATION DEVICE AND METHOD FOR PROVIDING CONTROL APPLICATIONS VIA A COMMUNICATION NETWORK FOR TRANSMITTING TIME-CRITICAL DATA

(71) Applicant: Siemens Aktiengesellschaft, Munich (DE)

(72) Inventors: Harald Albrecht, Nuremberg (DE); Stephan Höme, Schwabach (DE); Martin Rziha, Zirndorf (DE); Thomas Talanis, Heroldsbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/430,372

(22) PCT Filed: Mar. 2, 2020

(86) PCT No.: PCT/EP2020/055392
§ 371 (c)(1),
(2) Date: Aug. 12, 2021

(87) PCT Pub. No.: WO2020/193082
PCT Pub. Date: Oct. 1, 2020

(65) Prior Publication Data
US 2022/0137604 A1 May 5, 2022

(30) Foreign Application Priority Data
Mar. 28, 2019 (EP) .................................. 19165782

(51) Int. Cl.
*H04L 41/0895* (2022.01)
*H04L 47/72* (2022.01)
(Continued)

(52) U.S. Cl.
CPC .......... *H04L 41/0895* (2022.05); *H04L 47/72* (2013.01); *G05B 19/41835* (2013.01); *H04L 45/3065* (2013.01); *H04L 65/80* (2013.01)

(58) Field of Classification Search
CPC ..... H04L 47/72; H04L 45/3065; H04L 65/80; H04L 47/726; H04L 41/08;
(Continued)

(56) References Cited

U.S. PATENT DOCUMENTS 10,776,157 B2 * 9/2020 Abali ................... G06F 9/45533
11,036,555 B2 * 6/2021 Lu .......................... G06F 9/5061
(Continued)

FOREIGN PATENT DOCUMENTS

CN     1734421      2/2006
CN     102737159   10/2012
(Continued)

OTHER PUBLICATIONS

Hwang et al., "Enterprise-Scale Cloud Migration Orchestrator", IEEE 2015 (Year: 2015).*
(Continued)

*Primary Examiner* — Omer S Mian
(74) *Attorney, Agent, or Firm* — Cozen O'Connor

(57) ABSTRACT

Coordinator and method for providing control applications via a communication network, wherein prior to migrating a flow control component of a control application to a server device, a coordinator checks whether a data stream for transmitting application data was set up for the control application, where the coordinator enables migration of the flow control component if a data stream has not been set up, in the event a data stream had been set up previously, a check is performed to determine whether sufficient resources for data transmission are available for paths to the server device, such that if sufficient resources are unavailable, migration of
(Continued)

the respective flow control component is stopped, and if sufficient resources are available, the coordinator prompts set-up of the data stream to the server device and disconnection of the previously set-up data stream and enables migration of the flow control component to the server device.

21 Claims, 2 Drawing Sheets

(51) Int. Cl.
G05B 19/418 (2006.01)
H04L 45/302 (2022.01)
H04L 65/80 (2022.01)

(58) Field of Classification Search
CPC .......... H04L 41/0895; G05B 19/41835; G05B 2219/31368; G05B 19/41855; Y02D 30/00; Y02P 90/02
See application file for complete search history.

(56) References Cited

U.S. PATENT DOCUMENTS

| | | | |
|---|---|---|---|
| 2006/0026012 A1 | 2/2006 | Campbell | |
| 2012/0239734 A1 | 9/2012 | Dominick et al. | |
| 2014/0129521 A1 | 5/2014 | Marsden | |
| 2014/0237119 A1* | 8/2014 | Chung | H04L 67/02 709/226 |
| 2016/0210141 A1 | 7/2016 | Gunti et al. | |
| 2017/0104689 A1* | 4/2017 | Narayanasamy | G06F 9/45558 |
| 2017/0300353 A1* | 10/2017 | Yu | H04L 45/302 |
| 2017/0353878 A1* | 12/2017 | Yamada | H04W 16/04 |
| 2017/0373935 A1* | 12/2017 | Subramanian | G06F 9/5072 |
| 2020/0259896 A1* | 8/2020 | Sachs | H04J 3/0667 |
| 2021/0406050 A1* | 12/2021 | Huang | G06F 9/4856 |

FOREIGN PATENT DOCUMENTS

| | | |
|---|---|---|
| CN | 104115469 | 10/2014 |
| CN | 109416643 | 3/2019 |
| EP | 2324601 | 5/2011 |
| EP | 2538619 | 12/2012 |
| EP | 3618384 | 3/2020 |
| EP | 3664510 | 6/2020 |
| WO | 2019001718 | 1/2019 |

OTHER PUBLICATIONS

Pattaranantakul et al., "NFV Security Survey: From Use Case Driven Threat Analysis to State-of-the-Art Countermeasures", IEEE 2018 (Year: 2018).*
Nasrallah Ahmed et al.: "Ultra-Low Latency (ULL) Networks: The IEEE TSN and IETF DetNet Standardsand Related 5G ULL Research", arxiv.org, Cornell University Library, 201 Olin Library Cornell University Ithaca, NY 14853, Abstract, p. 17, col. 2—p. 18, col. 1; p. 4, col. 1—p. 10, col. 2, figures 3-7; 2018.
PCT International Search Report dated May 29, 2020 based on PCT/EP2020/055392 filed Mar. 2, 2020.

* cited by examiner

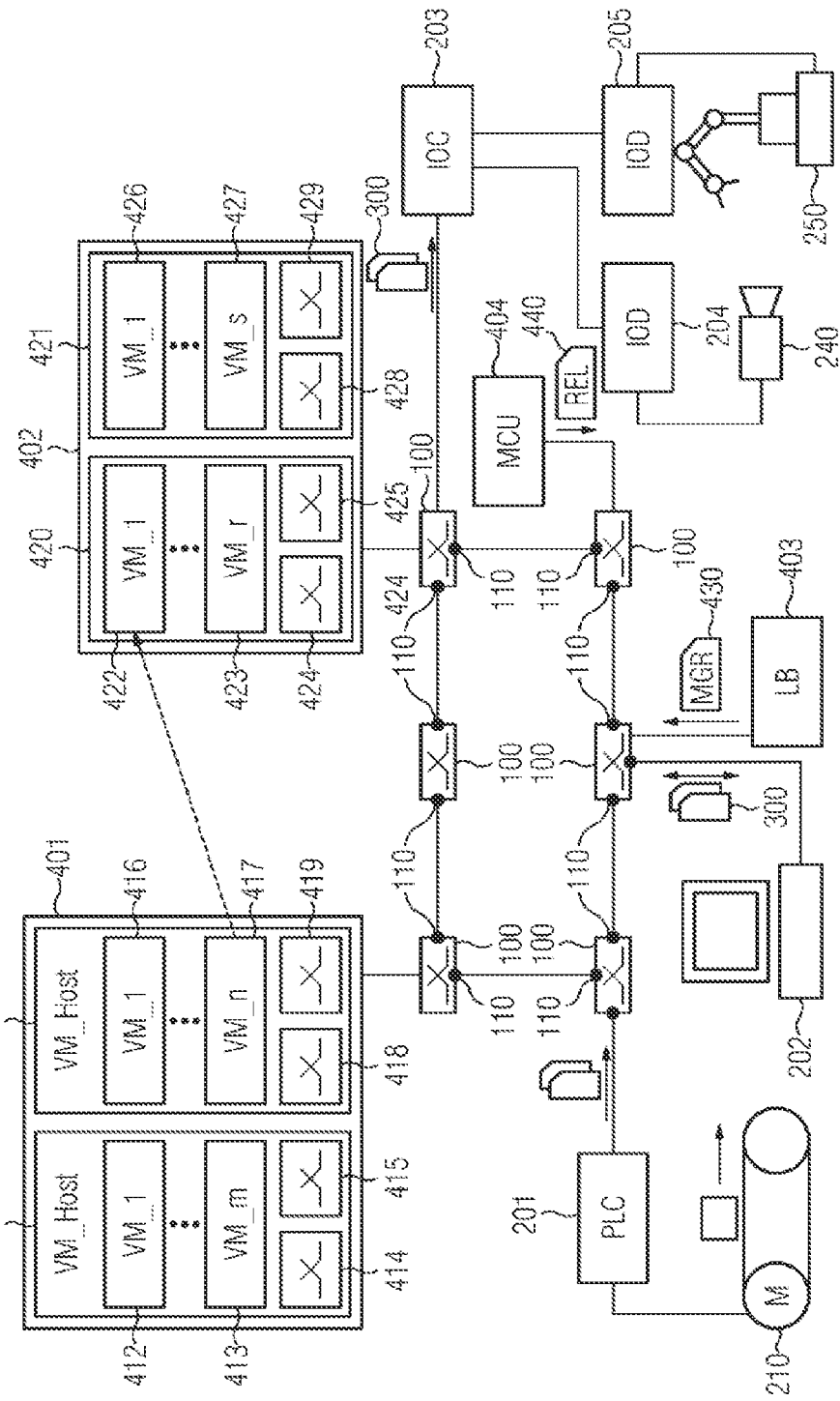

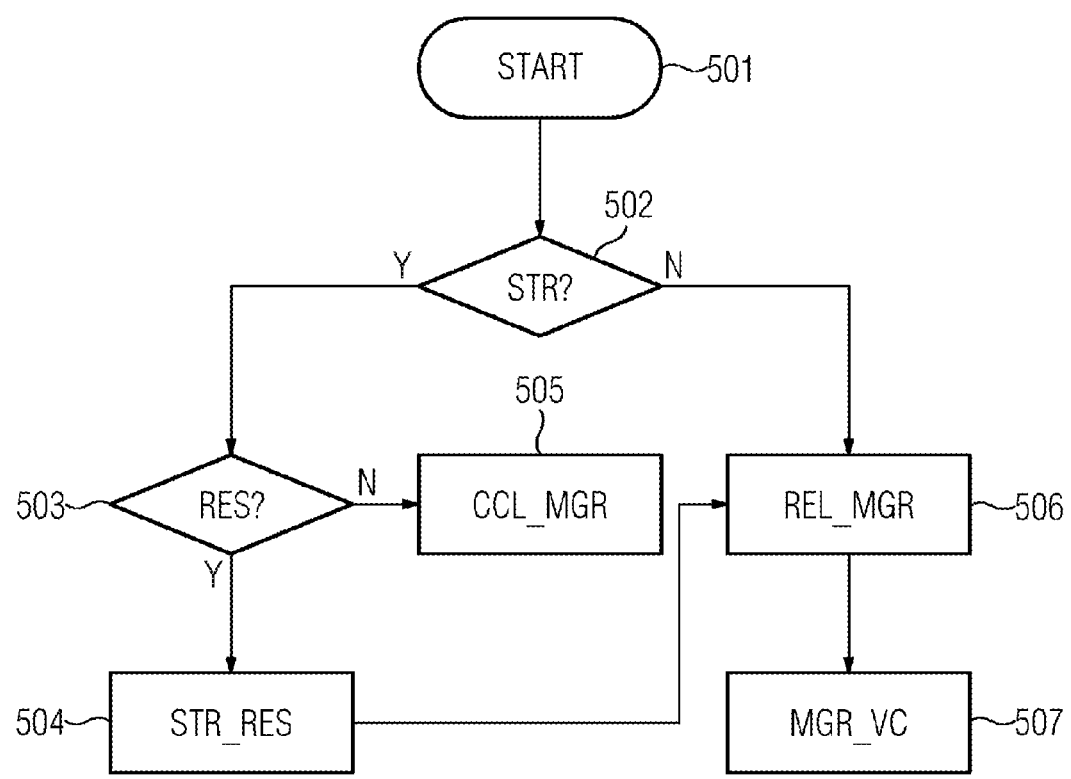

COORDINATION DEVICE AND METHOD FOR PROVIDING CONTROL APPLICATIONS VIA A COMMUNICATION NETWORK FOR TRANSMITTING TIME-CRITICAL DATA

CROSS-REFERENCE TO RELATED APPLICATIONS

This is a U.S. national stage of application No. PCT/2020/055392 filed 2 Mar. 2020. Priority is claimed on European Application No. 19165782.4 filed 28 Mar. 2019, the content of which is incorporated herein by reference in its entirety.

BACKGROUND OF THE INVENTION

1. Field of the Invention

The invention relates to industrial automation systems and, more particularly, to coordination device and method for providing control applications via a communication network for transmitting time-critical data.

2. Description of the Related Art

An industrial automation system normally comprises a multiplicity of automation devices networked to one another via an industrial communication network and is used for controlling or regulating installations, machines or devices for the purposes of production or process automation. Time-critical constraints in industrial automation systems mean that predominantly real-time communication protocols, such as PROFINET, PROFIBUS, real-time Ethernet or time-sensitive networking (TSN), are used for communication between automation devices.

Interruptions to communication connections between computer units of an industrial automation system or automation devices can lead to undesirable or unnecessary repetition of a transmission of a service request. Additionally, messages that are not transmitted or not transmitted completely can prevent an industrial automation system from changing to or remaining in a safe operating state, for example. This can finally lead to failure of a complete production installation and to costly production downtime. One particular problem area in industrial automation systems regularly results from message traffic that contains relatively many but relatively short messages, which intensifies the above problems.

Use for often extremely different applications can create problems in Ethernet-based communication networks, for example, if network resources are used for transmitting data streams or data frames with real-time demands in competition with transmitting data frames having a large payload content without specific quality of service demands. This can lead to data streams or data frames with real-time demands not being transmitted in accordance with a demanded or required quality of service.

EP 2 324 601 B1 discloses a method for transmitting data packets in a communication network, in which first data packets having a low priority are transmitted between a transmitter and a receiver of the communication network. Second data packets having a high priority are transmitted with preference over the first data packets between the transmitter and the receiver. For a second data packet that is to be transmitted from the transmitter to the receiver, a check is performed to determine whether a first data packet is currently being transmitted. If the check to determine whether a first data packet is currently being transmitted is positive, then the transmission of the first data packet is terminated or interrupted, and the second data packet is subsequently transmitted. When the second data packet has been transmitted, the transmission of the first data packet that has not been transmitted is repeated or the transmission of the rest of the incompletely transmitted first data packet is prompted. Each first data packet is stored in a buffer store in parallel with a transmission process and is erased from the buffer store only after a complete transmission of the first data packet to the receiver.

EP 2 538 619 B1 describes a method for transmitting data packets containing multiple data frames in an Ethernet automation network, in which, when a first data packet having a first priority has been received by a transmitter, a transmission process for the first data packet from the transmitter to a receiver is started. When a second data packet that needs to be transmitted to the receiver and has a second priority, which is higher than the first priority, is received, the transmission process for the first data packet is terminated within one of the data frames of the first data packet that is in the transmission process at the time of reception of the second data packet. The second data packet is then transmitted from the transmitter to the receiver.

The earlier international patent application PCT/EP2017/066175 describes a method for data transmission that allows a combination of protected communication and low network configuration complexity. Here, a reservation of resources for transmitting data streams (streams) from a transmitter to a receiver involves at least two paths being reserved, at least sections of which are redundant. Extension of a reservation protocol performs automatic configuration of duplicate filters at network nodes assigned to redundant path sections during a resource reservation.

In accordance with the earlier European patent application having the application file reference 18191982.0, in order to simulate processing of reservation requests for multicast data streams in communication networks, communication devices whose behavior is to be simulated are each functionally divided into a communication control plane, referred to as the control plane, and a data transmission plane, referred to as the data plane. Simulation system components formed by software containers executable in a flow control environment are each provided for functions of the communication devices that are assigned to the control plane. Network infrastructure devices are modelled on the data plane by resources that are each provided via the network infrastructure devices. The software containers assigned to the communication devices are selectively executed in the flow control environment, and coupled to one another therein, in accordance with a predefined topology.

The earlier European patent application having the application file reference 18210079.2 discloses a method for transmitting data packets to a data sink, in which a first step involves a data source using a first wireless interface of the data source to transmit a request to set up a first stream. The first request is received by a first receiver and forwarded via first nodes to the data sink. Based on the first request, a first path for the first stream is set up that leads from the data source via the first receiver and the first nodes to the data sink, and the first stream is assigned a first stream identification. Resources are reserved for the first receiver and the first nodes for the purpose of transmitting the data packets.

A second step of the transmission method known from the earlier European patent application having the application file reference 18210079.2 involves at least some of the data packets being transmitted from the data source to the first receiver and being forwarded from the first receiver via the first nodes to the data sink. The data packets transmitted from the data source to the first receiver contain the first stream identification. A third step, performed while the second step is being performed, involves the data source using a second wireless interface of the data source to transmit a second request to set up a second stream. The second request is received by a second receiver and forwarded via second nodes to the data sink. Based on the second request, a second path for the second stream is set up that leads from the data source via the second receiver and the second nodes to the data sink, and the second stream is assigned a second stream identification. The second stream identification is identical to the first stream identification. The second receiver and the second nodes reserve resources for the purpose of transmitting the data packets. A fourth step, performed while the second step is being performed, involves at least some of the data packets being transmitted from the data source to the second receiver and forwarded from the second receiver via the second nodes to the data sink.

Control applications, particularly industrial or automation applications, are increasingly provided via virtualization solutions and preferably run in encapsulated virtual machines. Virtual machines are essentially capable of running independently of physical hardware. In particular, virtual machines can be initially started on one selected hypervisor host and moved to a different hypervisor host within a computer cluster during their operation for the purposes of a migration. Such a migration can be motivated by load balancing within the computer cluster, for example.

A migration of a virtual machine to a different hypervisor host is frequently accompanied by a change of network topology. Based on this, a migration can result in disadvantageous effects for virtualized control applications in respect of connectivity or quality of service, in particular if path-granular quality of service guarantees are provided, or network resources are reserved, for data streams. Applicable problems could be solved, in principle, by precluding the provision of control applications via virtualization solutions, by precluding virtualized control applications from load balancing or via a manually initiated migration.

SUMMARY OF THE INVENTION

It is an object of the present invention to provide an apparatus and method for providing control applications via a communication network for transmitting time-critical data that allows both efficient utilization of available system resources and reliable maintenance of existing communication relationships.

This and other objects and advantages are achieved in accordance with the invention by a coordination device and method for providing control applications via a communication network for transmitting time-critical data involves the control applications being provided by server devices via the communication network for use on terminals. The control applications are each provided via flow control components that are loadable into and executable in flow control environments formed via the server devices. The flow control components are each migratable to each of the different server devices for execution therein.

Furthermore, selected datagrams are assigned to data streams and transmitted between the server devices and the terminals via paths of the communication network that comprise at least the server devices and the terminals. In order to reserve resources that need to be provided by forwarding communication devices along the paths for a transmission of the data streams, the server devices and/or the terminals specify quality of service parameters for the data streams. In the event of a reservation request, the forwarding communication devices and/or a superordinate communication control device each check/checks whether sufficient resources for data transmission while maintaining the specified quality of service parameters are available in the respective forwarding communication device. If there are sufficient resources along the paths, then the forwarding communication devices are each configured to provide resources for the data streams. The resources to be provided by the forwarding communication devices comprise usable transfer time windows, bandwidth, assured maximum latency, number of queues, queue cache and/or address cache in switches or bridges, for example.

Before a flow control component of a control application is migrated to a respective selected server device, in accordance with the invention a coordination device checks whether a data stream for transmitting application data has previously been set up for the respective control application. If a data stream has not been set up, then the coordination device approves the migration of the respective flow control component. On the other hand, if a data stream has previously been set up, then the coordination device checks whether sufficient resources for data transmission while maintaining the specified quality of service parameters are available for paths to the selected server device. If sufficient resources are not available, then the coordination device prevents the migration of the respective flow control component. If there are sufficient resources, then the coordination device prompts setup of a data stream to the selected server device and clearance of the previously set-up data stream and approves the migration of the respective flow control component to the selected server device.

The method in accordance with the invention can be used to ensure network resources that are required or that have been reserved hitherto are also available on a different or new hypervisor host when a control application is migrated thereto. This makes it possible to prevent an unwanted loss of connectivity from occurring after a migration. In particular, load balancing can thus also be used for control applications in order to make optimum use of host hardware and to make the host hardware available.

Preferably, the forwarding communication devices are connected to one another via a time-sensitive network, in particular in accordance with Institute of Electrical and Electronics Engineers (IEEE) 802.1Q, IEEE 802.1AB, IEEE 802.1AS, IEEE 802.1BA and/or IEEE 802.1CB. A forwarding of the selected datagrams can, for example, be controlled via frame pre-emption, in particular in accordance with IEEE 802.1Qbu, via time-aware shapers, in particular in accordance with IEEE 802.1Qbv, via credit-based shapers, in particular in accordance with IEEE 802.1Qav, via burst limiting shapers, peristaltic shapers and/or priority-based shapers. Advantageously, reservation requests result in each of the data streams being set up bidirectionally, the terminals each being communication and/or automation devices. All in all, the above configurations can also support control applications having real-time demands.

In accordance with one preferred embodiment of the present invention, the server devices and/or the terminals each specify a data stream identifier for a reservation request. If there are sufficient resources, then a multicast address allocated to the specified data stream identifier is, in each case, transmitted to a respective server device and/or to a respective terminal. The server devices and/or the terminals can each specify the quality of service parameters for the data streams via a talker advertise message, for example. Accordingly, the server devices and/or the terminals can each specify the data stream identifiers via a listener ready message. The server devices can each have an assigned talker or listener function, or both functions. Preferably, the reservation requests are handled in accordance with IEEE 802.1Qcc. This allows a reliable and well-performing implementation of the present invention to be ensured.

In accordance with one advantageous embodiment of the present invention, the paths for the data streams are ascertained via shortest path bridging in accordance with IEEE 802.1aq. Furthermore, the forwarding communication devices can, for example, exchange topology information among one another, in particular in accordance with the IS-IS (intermediate system to intermediate system) protocol, for the purpose of ascertaining paths.

Preferably, the flow control environments are each formed via a hypervisor installed on a server device. A migration of a flow control component of a control application is in particular, in each case, initiated by a load balancing device. Furthermore, the paths for the data streams can also comprise virtual switches. The disclosed embodiments of the present invention can thus cover essentially any virtualization and migration scenarios.

For the purposes of a migration the coordination device can itself perform the clearance of the previously set-up data stream and the setup of the data stream to the selected server device, if there are sufficient resources. Alternatively, for the purposes of a migration the coordination device can notify the respective control application accordingly if there are sufficient resources. Here, the respective control application performs the setup of the data stream to the selected server device and the clearance of the previously set-up data stream.

The coordination device in accordance with the invention is intended to implement the method in accordance with the preceding embodiments and is configured to check, before a flow control component of a control application is migrated to a respective selected server device, whether a data stream for transmitting application data has previously been set up for the respective control application. Moreover, the coordination device is configured to approve the migration of the respective flow control component if a data stream has not been set up and, if a data stream has previously been set up, to check whether sufficient resources for data transmission while maintaining previously specified quality of service parameters are available for paths to the selected server device.

In accordance with the invention, the coordination device is configured to prevent the migration of the respective flow control component if sufficient resources are not available and, if there are sufficient resources, to prompt setup of a data stream to the selected server device and clearance of the previously set-up data stream and to approve the migration of the respective flow control component to the selected server device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which:

FIG. 1 shows an industrial automation system having virtualized control applications that comprises multiple communication and automation devices in accordance with the invention;

FIG. 2 shows a flowchart for the provision of virtualized control applications via a communication network for transmitting time-critical data in accordance with the invention.

DETAILED DESCRIPTION OF THE EXEMPLARY EMBODIMENTS

The industrial automation system depicted in FIG. 1 comprises a communication network for transmitting time-critical data having multiple bridges or switches 100 as communication devices that forward datagrams. Bridges or switches 100 each comprise multiple ports 110 and also a backplane switch as a coupling element and are particularly used for connecting programmable logic controllers 201, operating and observation stations 202, I/O controllers 203 or I/O modules 204-205, which are likewise communication devices or communication terminals. In the present exemplary embodiment, the communication network is configured as a time-sensitive network, in particular in accordance with Institute of Electrical and Electronics Engineers (IEEE) 802.1Q, IEEE 802.1AB, IEEE 802.1AS, IEEE 802.1BA and/or IEEE 802.1CB. Forwarding of data frames (frames) in the communication network can advantageously be controlled via frame pre-emption, in particular in accordance with IEEE 802.1Qbu, time-aware shapers, in particular in accordance with IEEE 802.1Qbv, credit-based shapers, in particular in accordance with IEEE 802.1Qav, burst limiting shapers, peristaltic shapers and/or priority-based shapers. Furthermore, there is preferably provision for multiple transmission queues (queues) for each port 110 of a transmitting or forwarding communication device 100, 201-205.

Programmable logic controllers 201 typically each comprise a communication module, a central processing unit and at least one input/output unit. Input/output units can essentially also be configured as local peripheral modules that are arranged remotely from a programmable logic controller. The communication module can be used to connect a programmable logic controller 201 to a switch or router or additionally to a field bus. The input/output unit is used for exchanging controlled and measured variables between the programmable logic controller 201 and a machine or apparatus 210 controlled by the programmable logic controller 201. The central processing unit is particularly intended for ascertaining suitable controlled variables from captured measured variables. The above components of the programmable logic controller 201 are connected to one another via a backplane bus system, for example.

The I/O modules 204-205 are also intended to exchange controlled and measured variables with connected machines or apparatuses 240, 250. To control the I/O modules 204-205 there is provision for one assigned I/O controller 203 per automation cell, for example. The I/O modules 204-205 can essentially also be actuated by a remote programmable logic controller 201.

An operating and observation station 202 is used for visually displaying process data or measured and controlled variables that are processed or captured by programmable logic controllers, input/output units or sensors. In particular, an operating and observation station 202 is used for displaying values of a control loop and for altering control parameters. Operating and observation stations 202 comprise at least a graphical user interface, an input device, a processor unit and a communication module.

Furthermore, the industrial automation system depicted in FIG. 1 comprises multiple server clusters 401, 402, each having multiple servers 410-411, 420-421 that are used as hosts for virtual machines 412-413, 416-417, 422-423, 426-427 and virtual switches 414-415, 418-419, 424-425, 428-429. In particular, the servers 410-411, 420-421 use the virtual machines 412-413, 416-417, 422-423, 426-427 to provide virtualized control applications via the communication network for use on terminals. Terminals include, for example, the communication and automation devices 201, 202, 203, 204, 205.

The control applications are preferably used to make monitoring, control or analysis functions available for the communication and automation devices 201, 202, 203, 204, 205.

The control applications are each provided via flow control components that are loadable into and executable in flow control environments formed via the virtual machines 412-413, 416-417, 422-423, 426-427. The flow control environments are preferably each formed via a hypervisor installed on a server 410-411, 420-421. The flow control components can therefore each be migrated to different servers for execution therein. A migration of a flow control component of a control application is initiated by a load balancing device 403, for example, which can be either realized as a separate unit or integrated in a server cluster 401, 402.

For the purposes of transmitting time-critical data assigned to the virtualized control applications, selected data frames (frames) 300 are assigned to data streams and transmitted between the virtual machines 412-413, 416-417, 422-423, 426-427 and the communication and automation devices 201, 202, 203, 204, 205 via paths of the communication network that comprise at least the virtual machines 412-413, 416-417, 422-423, 426-427 and the communication and automation devices 201-205. These paths can be ascertained via shortest path bridging in accordance with IEEE 802.1aq and can particularly comprise the virtual switches 414-415, 418-419, 424-425, 428-429.

Preferably, the bridges or switches 100 exchange topology information among one another in accordance with the IS-IS (intermediate system to intermediate system) protocol for the purpose of ascertaining paths.

In order to reserve resources that need to be provided by the bridges or switches 100 along the paths for the transmission of the data streams, the virtual machines 412-413, 416-417, 422-423, 426-427 and/or the communication and automation devices 201, 202, 203, 204, 205 specify quality of service parameters for the data streams. In accordance with a local stream reservation model, the bridges or switches 100 each check whether sufficient resources for data transmission while maintaining the specified quality of service parameters are available in the respective forwarding communication device. Alternatively, a check on an availability of sufficient resources can be performed in accordance with a central stream reservation model by a superordinate communication control device.

If there are sufficient resources along the paths, then the bridges or switches 100 are each configured to provide resources for the data streams, either in accordance with a local stream reservation model or in accordance with a central stream reservation model. The resources to be provided by the bridges or switches 100 particularly comprise usable transfer time windows, bandwidth, assured maximum latency, number of queues, queue cache and/or address cache in the bridges or switches. Preferably, reservation requests result in the data streams being each set up bidirectionally.

In the present exemplary embodiment, the load balancing device 403 initiates a migration of a control application from a server 411 used hitherto to a selected different server 420 by transmitting a request 430 to a coordination device 404, in accordance with step 501 of the flowchart depicted in FIG. 2. This coordination device 404 can be either realized as a separate unit or integrated in a server cluster 401, 402. After receiving the request 430, before a flow control component of the control application is migrated to the selected server 420, the coordination device 404 checks, in accordance with step 502, whether a data stream for transmitting application data has previously been set up for the respective control application.

If a data stream has not been set up, then the coordination device 404 approves the migration of the respective flow control component in accordance with step 506 and transmits an acknowledgement 440 with an approval to the load balancing device 403. The load balancing device 403 subsequently migrates the flow control component of the control application to the selected server 420 (step 507).

If a data stream has previously been set up, the coordination device 404 checks, in accordance with step 503, whether sufficient resources for data transmission while maintaining the specified quality of service (QoS) parameters are available for paths to the selected server device 420. If sufficient resources are not available, then the coordination device 404 prevents the migration of the respective flow control component (step 505) and transmits an acknowledgement 440 with a rejection of the migration to the load balancing device 403. On the other hand, if there are sufficient resources, then the coordination device prompts setup of a data stream to the selected server 420 and clearance of the previously set-up data stream in accordance with step 504.

For the purposes of a migration, the coordination device 404 can itself in principle perform the setup of the data stream to the selected server 420 and the clearance of the previously set-up data stream, if there are sufficient resources. Alternatively, for the purposes of a migration, the coordination device can notify the respective control application accordingly if there are sufficient resources so that the respective control application performs the setup of the data stream to the selected server 420 and the clearance of the previously set-up data stream. Following successful setup of the data stream to the selected server 420, the coordination device 404 approves the migration of the respective flow control component in accordance with step 506 and transmits an acknowledgement 440 with an approval to the load balancing device 403. The load balancing device 403 subsequently migrates the flow control component of the control application to the selected server 420 (step 507).

In the present exemplary embodiment, the reservation requests are handled in accordance with IEEE 802.1Qcc. The virtual machines 412-413, 416-417, 422-423, 426-427 can each have an assigned talker or listener function. In particular, the virtual machines 412-413, 416-417, 422-423, 426-427 or the communication and automation devices 201, 202, 203, 204, 205 each specify a data stream identifier for a reservation request. If there are sufficient resources, then a multicast address allocated to the specified data stream identifier is, in each case, transmitted to a respective virtual machine 412-413, 416-417, 422-423, 426-427 or to a respective communication and automation device 201, 202, 203, 204, 205. Preferably, the virtual machines 412-413, 416-417, 422-423, 426-427 or the communication and automation devices 201, 202, 203, 204, 205 each specify the quality of service parameters for the data streams via a talker advertise message. Accordingly, the data stream identifiers are each specified via a listener ready message.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing control applications via a communication network for transmitting time-critical data, the control applications being provided by server devices via the communication network for use on terminals, the control applications each being provided via flow control components which are loadable into and executable in flow control environments formed via the server devices, the flow control components each being migratable to different server devices for execution therein, the method comprising:

assigning selected datagrams to data streams and transmitting said selected datagrams between the server devices and the terminals via paths of the communication network which comprise at least the server devices and the terminals;

specifying, by at least one of the server devices and the terminals, quality of service parameters for the data streams to reserve resources which need to be provided by forwarding communication devices along the paths for a transmission of the data streams;

performing, by at least one of (i) each one of the forwarding communication devices and (ii) a superordinate communication control device, a check to determine whether sufficient resources for data transmission while maintaining the specified quality of service parameters are available in the respective forwarding communication device in an event of a reservation request;

configuring each of the forwarding communication devices to provide resources for the data streams if sufficient resources are available along the paths;

performing, by a coordination device, a check to determine whether a data stream for transmitting application data has previously been set up for the respective control application before migrating a flow control component of a control application to a respective selected server device;

approving, by the coordination device, the migration of the respective flow control component, if the data stream has not been set up;

performing, by the coordination device, a check to determine whether sufficient resources for data transmission while maintaining the specified quality of service parameters are available for paths to the selected server device, if the data stream has previously been set up;

preventing, by the coordination device, the migration of the respective flow control component if sufficient resources are not available; and prompting, by the coordination device, setup of the data stream to the selected server device and clearance of the previously set-up data stream and approving the migration of the respective flow control component to the selected server device if sufficient resources are available.

2. The method as claimed in claim 1, wherein the resources to be provided by the forwarding communication devices comprise at least one of usable transfer time windows, bandwidth, assured maximum latency, number of queues, queue cache and address cache in switches or bridges.

3. The method as claimed in claim 1, wherein the forwarding communication devices are interconnected via a time-sensitive network.

4. The method as claimed in claim 1, wherein the time-sensitive network is in accordance with at least one of Institute of Electrical and Electronics Engineers (IEEE) 802.1Q, IEEE 802.1AB, IEEE 802.1AS, IEEE 802.1 BA and IEEE 802.1CB.

5. The method as claimed in claim 2, wherein the forwarding communication devices are interconnected via a time-sensitive network.

6. The method as claimed in claim 5, wherein the a time-sensitive network is in accordance with at least one of Institute of Electrical and Electronics Engineers (IEEE) 802.1Q, IEEE 802.1AB, IEEE 802.1AS, IEEE 802.1 BA and IEEE 802.1CB.

7. The method as claimed in claim 3, wherein forwarding of the selected datagrams is controlled via at least one of frame pre-emption, time-aware shapers, in particular in accordance with IEEE 802.1Qbv, credit-based shapers, burst limiting shapers, peristaltic shapers and priority-based shapers.

8. The method as claimed in claim 7, wherein pre-emption is in accordance with Institute of Electrical and Electronics Engineers (IEEE) 802.1Qbu, time-aware shapers is in accordance with IEEE 802.1Qbv and credit-based shapers is in accordance with IEEE 802.1Qav.

9. The method as claimed in claim 1, wherein reservation requests result in the data streams being each set up bidirectionally; and wherein the terminals comprise at least one of communication and automation devices.

10. The method as claimed in claim 1, wherein at least one of the server devices and the terminals each specify a data stream identifier for a reservation request; and wherein a multicast address allocated to each specified data stream identifier is transmitted to at least one of a respective server device and a respective terminal if sufficient resources are available.

11. The method as claimed in claim 10, wherein at least one of the server devices and the terminals each specify the quality of service parameters for the data streams via a talker advertise message; and wherein at least one of the server devices and the terminals each specify the data stream identifiers via a listener ready message.

12. The method as claimed in claim 10, wherein the server devices each have at least one of an assigned talker and listener function.

13. The method as claimed in claim 11, wherein the server devices each have at least one of an assigned talker and listener function.

14. The method as claimed in claim 10, wherein the reservation requests are handled in accordance with Institute of Electrical and Electronics Engineers (IEEE) 802.1Qcc.

15. The method as claimed in claim 1, wherein the paths for the data streams are ascertained via shortest path bridging in accordance with Institute of Electrical and Electronics Engineers (IEEE) 802.1aq.

16. The method as claimed in claim 1, wherein the forwarding communication devices exchange topology information among one another to ascertain paths.

17. The method as claimed in claim 16, wherein the topology information is exchanged in accordance with the Intermediate System-Intermediate System (IS-IS) protocol.

18. The method as claimed in claim 1, wherein the flow control environments are each formed via a hypervisor installed on a server device; wherein each migration of a flow control component of a control application is initiated by a load balancing device; and wherein the paths for the data streams comprise virtual switches.

19. The method as claimed in claim 1, wherein the coordination device performs the setup of the data stream and the clearance of the previously set-up data stream to the selected server device for purposes of the migration, if sufficient resources are available.

20. The method as claimed in claim 1, wherein, for the purposes of a migration, the coordination device notifies the respective control application accordingly if sufficient resources are available; and wherein the respective control application performs the setup of the data stream to the selected server device and the clearance of the previously set-up data stream.

21. An apparatus for carrying out the method of claim 1, the apparatus comprising:

the server devices, the terminals, and the coordination device, wherein the coordination device comprises:

a processor; and memory;

and wherein the coordination device is configured to:

check, before the flow control component of the control application is migrated to the respective selected server device, whether the data stream for transmitting application data has previously been set up for the respective control application;

approve the migration of the respective flow control component if the data stream has not been set up;

check whether sufficient resources for data transmission while maintaining previously specified quality of service parameters are available for paths to the selected server device if the data stream has previously been set up;

prevent the migration of the respective flow control component if sufficient resources are not available; and prompt setup of the data stream to the selected server device and clearance of the previously set-up data stream and approve the migration of the respective flow control component to the selected server device if sufficient resources are available.

* * * * *